United States Patent
Spicer et al.

(10) Patent No.: US 7,352,369 B2
(45) Date of Patent: Apr. 1, 2008

(54) SYSTEM AND METHOD FOR APPROXIMATING AN EDITABLE SURFACE

(75) Inventors: Sean Spicer, Katy, TX (US); Zitao Xu, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 121 days.

(21) Appl. No.: 11/118,027

(22) Filed: Apr. 29, 2005

(65) Prior Publication Data

US 2005/0246130 A1    Nov. 3, 2005

Related U.S. Application Data

(60) Provisional application No. 60/566,574, filed on Apr. 29, 2004.

(51) Int. Cl.
*G06T 15/00* (2006.01)
*G06T 17/00* (2006.01)

(52) U.S. Cl. .................... 345/420; 345/419
(58) Field of Classification Search .......... 345/423; 702/152
See application file for complete search history.

(56) References Cited

U.S. PATENT DOCUMENTS

| | | | |
|---|---|---|---|
| 6,765,570 B1 | 7/2004 | Cheung et al. | 345/420 |
| 7,023,432 B2* | 4/2006 | Fletcher et al. | 345/419 |
| 2002/0145607 A1* | 10/2002 | Dimsdale | 345/423 |
| 2002/0149585 A1* | 10/2002 | Kacyra et al. | 345/428 |
| 2002/0164067 A1* | 11/2002 | Askey et al. | 382/154 |
| 2003/0067461 A1* | 4/2003 | Fletcher et al. | 345/420 |
| 2003/0101030 A1* | 5/2003 | Harwood | 703/2 |
| 2003/0198404 A1* | 10/2003 | Frisken et al. | 382/285 |
| 2004/0027347 A1* | 2/2004 | Farsaie | 345/419 |
| 2004/0051711 A1* | 3/2004 | Dimsdale et al. | 345/419 |
| 2004/0075656 A1* | 4/2004 | Kimia et al. | 345/420 |
| 2004/0105573 A1* | 6/2004 | Neumann et al. | 382/103 |
| 2004/0108999 A1* | 6/2004 | Martin | 345/423 |
| 2004/0223636 A1* | 11/2004 | Edic et al. | 382/131 |
| 2004/0249615 A1* | 12/2004 | Grzeszczuk et al. | 703/2 |
| 2005/0128211 A1* | 6/2005 | Berger et al. | 345/582 |
| 2005/0168460 A1* | 8/2005 | Razdan et al. | 345/419 |
| 2005/0168461 A1* | 8/2005 | Acosta et al. | 345/419 |
| 2005/0257748 A1* | 11/2005 | Kriesel et al. | 119/51.02 |
| 2006/0078172 A1* | 4/2006 | Zhang et al. | 382/118 |
| 2006/0082598 A1* | 4/2006 | Ohishi et al. | 345/653 |
| 2006/0197759 A1* | 9/2006 | Fremming | 345/420 |

(Continued)

FOREIGN PATENT DOCUMENTS

WO    WO 02/37422 A1    5/2002

OTHER PUBLICATIONS

Foley, James D.; van Dam, Andries; Feiner, Steven k.; Hughes, John F.; "Computer Graphics Principles and Practice;" 1996, Addison-Wesley Publishing Company; Second Edition; pp. 495-496.*

(Continued)

*Primary Examiner*—Mark Zimmerman
*Assistant Examiner*—Crystal Murdoch
(74) *Attorney, Agent, or Firm*—Crain, Caton & James

(57) ABSTRACT

A system and methods are disclosed for automatically approximating an editable surface from a 3D data set or a 3D point set, which may be imaged in the form of a NURBS surface.

62 Claims, 7 Drawing Sheets

U.S. PATENT DOCUMENTS

2006/0288756 A1* 12/2006 De Meurechy .............. 73/1.01
2007/0024620 A1* 2/2007 Muller-Fischer et al. ... 345/427

OTHER PUBLICATIONS de Berg et al; "Computational Geometry Algorithms and Applications;" 1998; Springer-Verlag Berlin Heidelberg; Second Edition; pp. 235-249.*

Altmann, Markus; "About Nonuniform Rational B-Splines-NURBS," Worcester Polytechnic Institute, Computer Science Department [online], [retrieved on Apr. 27, 2004]. Retrieved from the Internet <URL: www.cs.wpi.edu/~matt/courses/cs563/talks/nurbs.html>.

Dyn, Nira, "Interpolation in Scattered Data by Radial Functions," 1987, pp. 47-61, In Chui, C.K.; Schumaker, L.L.; Ultreres, F. I(ed), *Topics in Multivariate Approximation*, Academic Press.

Fisher, Robert, "Spatial Filters—Gaussian Smoothing," The University of Edinburgh, Science and Engineering, School of Informatics [online], [retrieved Apr. 18, 2005]. Retrieved from the Internet <URL: http://homepages.inf.ed.ac.uk/rbf/HIPR2/gsmooth.htm>.

Harder, Robert L., Desmarais, Robert N., "Interpolation Using Surface Splinee," Feb. 1972, pp. 189-191, *Journal of Aircraft 9*.

Hoppe, Hugues, et al., "Surface Reconstruction from Unorganized Points," 1992, pp. 71-78, *Computer Graphics 26*.

Hoscheck, J., Lasser, D., *Scattered Data Interpolation*, Chap. 9, in "Fundamentals of Computer Aided Geometric Design," pp. 388-437, Wellesley, Mass., A. K. Peters, Ltd., 1993.

Shepard, Donald, "A two dimensional interpolation function for irregularly-spaced data," Jan. 1968, pp. 517-524, Proceedings 23$^{rd}$ ACM National Conference.

* cited by examiner

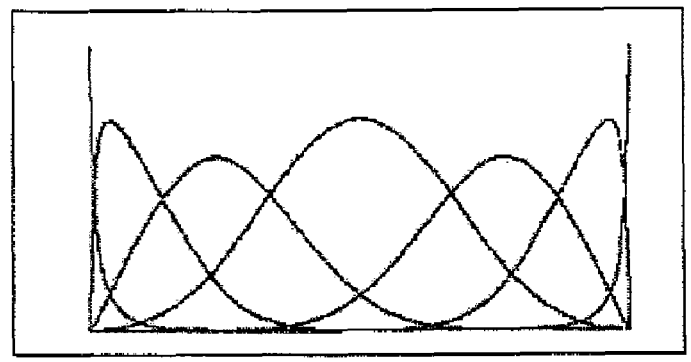
FIG. 11 - PRIOR ART
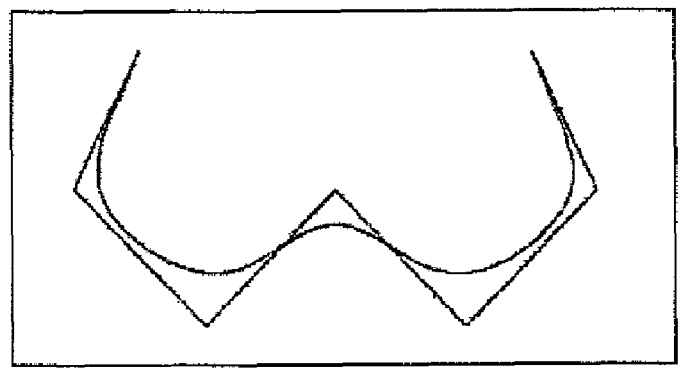
FIG. 12 - PRIOR ART
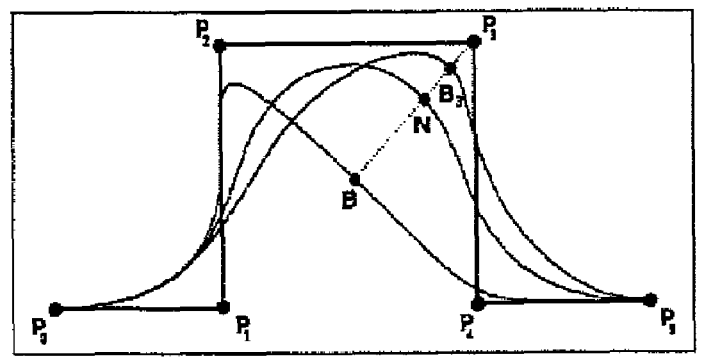
FIG. 13 - PRIOR ART

SYSTEM AND METHOD FOR APPROXIMATING AN EDITABLE SURFACE

CROSS-REFERENCE TO RELATED APPLICATIONS

The priority of U.S. Provisional Application No. 60/566,574, filed on Apr. 29, 2004, is hereby claimed, and the specification thereof is incorporated herein by reference.

STATEMENT REGARDING FEDERALLY SPONSORED RESEARCH OR DEVELOPMENT

Not applicable.

FIELD OF THE INVENTION

The present invention generally relates to systems and methods for automatically approximating an editable surface from a 3D data set or 3D point set, which may be imaged in the form of a NURBS surface.

BACKGROUND OF THE INVENTION

Non-Uniform Rational B-Splines (NURBS) are industry standard tools for the representation and design of geometry. NURBS, as explained by Markus Altmann in "About Non-uniform Rational B-Splines—NURBS," are used for a variety of reasons. They offer one common mathematical form for both standard analytical shapes (e.g., conics) and free-form shapes. NURBS provide the flexibility to design a large variety of shapes and can be evaluated reasonably fast by numerically stable and accurate algorithms. They are invariant under affine as well as perspective transformations and are generalizations of non-rational B-Splines and non-rational and rational Bezier curves and surfaces.

However, one of the drawbacks of NURBS is the need for extra storage to define traditional shapes (e.g., circles). This results from parameters in addition to the control points, but will allow the desired flexibility for defining parametric shapes. NURBS-shapes are not only defined by control points; weights, associated with each control point, are also necessary. A NURBS curve C(u), for example, which is a vector-valued piecewise rational polynomial function, may be defined as:

$$C(u) = \frac{\text{sum}(i=0, n)\{w_i * P_i * N_{i,k(u)}\}}{\text{sum}(i=0, n)\{w_i * N_{i,k(u)}\}} \quad (1)$$

where $w_i$ = weights $P_i$ = control points (vector)

$N_{i,k}$ = normalized B-spline basis functions of degree k.

The B-Splines are defined recursively as:

$$N_{i,k(u)} = \frac{u - t_i}{t_{i+k} - t_i} * N_{i,k-1(u)} + \frac{t_{i+k+1} - u}{t_{i+k+1} - t_{i+1}} * N_{i+1,k-1(u)} \text{ and} \quad (2)$$

$$N_{i,0(u)} = \begin{cases} 1, \text{ if } t_i <= u < t_{i+1} \\ 0, \text{ else} \end{cases}$$

where $t_i$ are the knots forming a knot vector and $U = \{t_0, t_1, \ldots, t_m\}$.

The Knot Vector

The knot vector uniquely determines the B-Splines as demonstrated above relative to equation (2). The relation between the number of knots (m+1), the degree (k) of $N_{i,k}$ and the number of control points (n+1) is given by m=n+k+1.

The sequence of knots in the knot vector U is assumed to be non-decreasing, i.e., $t_i <= t_{i+1}$. Each successive pair of knots represents an interval $[t_i, t_{i+1})$ for the parameter values to calculate a segment of a shape.

For NURBS, the relative parametric intervals (knot spans) need not be the same for all shape segments, i.e., the knot spacing is non-uniform, leading to a non-periodic knot vector of the form:

$$U = \{a, \ldots, a, t_{k+1}, \ldots, t_{m-k-1}, b, \ldots, b\}, \quad (3)$$

where a and b are repeated with multiplicity of k+1. The multiplicity of a knot affects the parametric continuity at this knot. Non-periodic B-Splines, like NURBS, are infinitely and continuously differentiable in the interior of a knot span and k−M−1 times continuously differentiable at a knot, where M is the multiplicity of the knot. In contrast, a periodic knot vector U={0, 1, . . . , n} is everywhere k−1 times continuously differentiable. Considering the knot vector for NURBS, the end knot points ($t_k$, t+1) with multiplicity k+1 coincide with the end control points $P_0$, $P_n$.

Since the knot spacing could be non-uniform, the B-Splines are no longer the same for each interval $[t_1, t_{i+1})$ and the degree of the B-Spline may vary. Considering the whole range of parameter values represented by the knot vector, the different B-Splines build up continuous (overlapping) blending functions $N_{i,k(u)}$, as defined in equation (2), over this range of parameter values, which are illustrated in FIG. 11. These blending functions have the following properties:

1. $N_{i,k(u)} >= 0$, for all i, k, u;
2. $N_{i,k(u)} = 0$, if u not in $[t_i, t_{i+k+1})$, meaning local support of k+1 knot spans, where $N_{i,k(u)}$ is nonzero;
3. If u in $[t_i, t_{i+1})$, the non-vanishing blending functions are $N_{i-k,k(u)}, \ldots, N_{i,k(u)}$;
4. Sum (j=i−k, i){$N_{j,k(u)}$}=sum(i=0, n){$N_{i,k(u)}$}=1, (partition of unity); and
5. In case of multiple knots, 0/0 is deemed to be zero.

The first and fourth properties, as illustrated in FIG. 12, together, result in a convex hull. The polyline of control points build up to a shape defined by a NURBS curve. The second and third properties illustrate that k+1 successive control points define a shape segment, and a control point is involved in k+1 neighboring shape segments. Therefore, changing a control point or weight influences just k+1 shape segments, defined over the interval given in equation (2).

Curve/Surface Definition

The previous definition of a NURBS-curve in equation (1) may be rewritten using rational basis functions:

$$R_{i,k(u)} = \frac{w_i * N_{ik(u)}}{\text{sum}(j=0, n)\{w_j * N_{j,k(u)}\}} \quad (4)$$

into:

$$C(u) = \text{sum}(i=0, n) \{P_i * R_{i,k(u)}\}. \quad (5)$$

A NURBS-surface may be defined in a similar way:

$$S(u, v) = \text{sum}(i=0, n) \text{sum}(j=0, m) P_{i,j} * R_{i,k,j,l(u, v)}$$

where $$R_{i,k,j,l(u,v)} = \frac{w_{i,j} * N_{i,k(u)} * N_{j,l(v)}}{\text{sum}(r=0,n)\{\text{sum}(s=0,m)\{w_{r,s} * N_{r,k(u)} * N_{s,l(u)}\}\}} \quad (6)$$

The rational basis functions have the same properties as the blending functions. One point to emphasize, is their invariance under affine and (even) perspective transformations. Therefore, only the control points have to be transformed to get the appropriate transformation of the NURBS shape.

Computational Algorithm

NURBS can be evaluated effectively by using homogeneous coordinates. The following steps demonstrate one method to perform the evaluation:
1. Add one dimension to the control points (e.g., P=(x, y)->P'(x, y, 1)) and multiply them by their corresponding weights, i.e., in 2D: $P_{i(xi, yi)} \rightarrow P_i(w_i * x_i, w_i * y_i, w_i)$
2. Calculate NURBS in homogeneous coordinates:

$$C'(u) = \text{sum}(i=0, n)\{P_i(u) * N_{i,k(u)}\}$$

3. Map "homogeneous" NURBS back to original coordinate system with:

$$\text{map}(X1, X2, \ldots, Xn, W) = \begin{cases} /(X1/W, X2/W, \ldots, Xn/W), & \text{if } W \neq 0 \\ \setminus (X1, X2, \ldots, Xn), & \text{if } W = 0 \end{cases} \quad (7)$$

$$C(u) = \text{map}(C'(u)) = \frac{\text{sum}(i=0,n)\{w_i * P_i * N_{i,k(u)}\}}{\text{sum}(i=0,n)\{w_i * N_{i,k(u)}\}}$$

For u in $[t_i, t_{i+1})$, the only existing blending functions to consider in evaluation of the curve at u are $N_{i-k,k(u)}, \ldots, N_{i,k(u)}$. An effective algorithm for the computation of the non-vanishing blending functions is described in C. deBoor, "A Practical Guide to Splines," 1978, New York, Springer-Verlag.

The Weights

As mentioned above, changing the weight $w_i$ of a control point $P_i$ affects only the range $[t_i, t_{i+k+1})$ (in case of a curve). The geometric meaning of the weights is illustrated in FIG. 13.

Defining the points: $B = C(u; w_i = 0)$;

$N = C(u; w_i = 1)$; and $B_i = C(u; w_i \text{ not} = \{0, 1\})$.

N and $B_i$ can also be expressed as:

$N = (1-a) * B + a * P_i$ $B_i = (1-b) * B + b * P_i$, where $a = R_{i,k}(u; w_i = 1)$ $b = R_{i,k}(u)$.

The following identity is obtained from the expression of a and b:

$(1-a)/a : (1-b)/b = P_i N/BN : P_i B_i / BB_i = w_i$, which is called the cross- or double ratio of the four points $P_i$, B, N, $B_i$. From these expressions, the effect of shape modification can be derived:
  $B_i$ sweeps out on a straight line segment;
  If $w_i = 0$ then Pi has no effect on shape;
  If $w_i$ increases, so b and the curve is pulled toward $P_i$ and pushed away from $P_j$, for j not =i;
  If $w_i$ decreases, so b and the curve is pushed away from $P_i$ and pulled toward $P_j$, for j not =i; and
  If $w_i \rightarrow$ infinity then b->1 and $B_i \rightarrow P_i$, if u in $[t_i, t_{i+k+1})$ The Problem Various techniques have been attempted for creating a NURBS surface in different fields of art. For example, International Publication No. WO 02/37422, and U.S. Pat. No. 6,765,570, incorporated herein by reference, propose various techniques for the manual generation of editable (NURBS) surfaces used in analyzing and interpreting seismic events. Other conventional applications propose creating an editable (NURBS) surface using interpolation techniques well known in the art. Such techniques may be referred to as an "exact-fit" approach to determining the editable surface. An exact-fit approach is more likely to render a less uniform, if not non-uniform, editable surface as compared to a "best-fit" approximation of the editable surface. Moreover, the exact-fit approach to defining an editable NURBS surface may be impractical, if not cost prohibitive, for large 3D data sets often encountered in the analysis of seismic data.

Other conventional methods for converting unordered points to surfaces are generally described in Shepard, D., "A two dimensional interpolation function for irregular spaced data," 1968, pp. 517-524, Proceedings $23^{rd}$ ACM National Conference. One well-known method for interpolating scattered points, defines a surface value based on given points and weight functions. Although the result is relatively rough, the fundamental idea has inspired many other methods.

Another well-known method, generally referred to as the "Thin Plate Spline" method has been incorporated in medical imaging applications and is capable of precisely guiding the target surface such that it passes through all given points. See Hardy, R. L. Desmarrais, R. N., "Interpolation using surface spline," 1972, pp. 189-197, Journal of Aircraft 9 and Dyn, N., "Interpolation in Scattered Data by Radial Functions," 1987, pp. 47-61, In Chui, C. K.; Schumaker, L. L.; Ultreres, F. I. (ed) Topics in Multivariate Approximation. However, this technique requires the inversion of large matrices, which is computationally expensive and generally impractical for a large number of input points that may only require a best-fit approximation.

Another conventional method for converting a point cloud to a surface is described in Hoppe, H., et al., "Surface Reconstruction from Unorganized Points, 1992, pp. 71-78, Comput. Graph. 26. However, this method assumes that the input points are evenly distributed over the entire domain, which is also impractical for input points that are densely populated in some areas and non-existent in other areas.

A need therefore, exists for automatically approximating an editable surface from a 3D data set or 3D point set comprising a large volume of unordered and/or unstructured data points, which may be imaged in the form of an editable NURBS surface.

SUMMARY OF THE INVENTION

The present invention meets the above needs and overcomes one or more deficiencies in the prior by providing systems and methods for automatically approximating an editable surface from a 3D data set or a 3D point set that may comprise a large volume of unstructured and/or unordered data points.

In one embodiment, the present invention includes a system for approximating an editable surface from a 3D data set comprising a computer-readable memory medium configured to store a program of instructions capable of being executable to implement: i) selecting a point set from the 3D data set; ii) determining a best-fit plane for the point set; iii) projecting at least a portion of the point set on to the best-fit plane; iv) determining a boundary for the best-fit plane according to the projected point set; v) projecting a grid on to the best-fit plane within the boundary, the grid containing a plurality of grid points; vi) initializing the grid points; vii) determining a value for at least a portion of the grid points; viii) selecting at least a portion of the grid points with a value; and ix) imaging the editable surface using at least a portion of the selected grid points.

In another embodiment, the present invention includes a system for approximating an editable surface from a 3D point set comprising a computer-readable memory medium configured to store a program of instructions capable of being executable to implement: i) determining a best-fit plane for the point set; ii) projecting the point set on to the best-fit plane; iii) determining a boundary for the best-fit plane according to the point set; iv) projecting a grid on to the best-fit plane within the boundary, the grid containing a plurality of grid points; v) initializing the grid points to zero; vi) determining a value for the grid points; vii) refining the value for at least a portion of the grid points; viii) selecting at least a portion of the grid points based on one of the value and the refined value; and ix) imaging the editable surface using the selected grid points, the editable surface representing a best-fit approximation of the point set to the editable surface.

In another embodiment, the present invention includes a method for approximating an editable surface from a 3D data set comprising the steps of: i) selecting a point set from 3D data set; ii) determining a best-fit plane for the point set; iii) projecting at least a portion of the point set on to the best-fit plane; iv) determining a boundary for the best-fit plane according to the projected point set; v) projecting a grid on to the best-fit plane within the boundary, the grid containing a plurality of grid points; vi) initializing the grid points; vii) determining a value for at least a portion of the grid points; viii) selecting at least a portion of the grid points with a value; and ix) imaging the editable surface using at least a portion of the selected grid points.

In yet another embodiment, the present invention includes a method for approximating an editable surface from a 3D point set comprising the steps of: i) determining a best-fit plane for the point set; ii) projecting a point set on to the best-fit plane; iii) determining a boundary for the best-fit plane according to the point set; iv) projecting a grid on to the best-fit plane within the boundary, the grid containing a plurality of grid points; v) initializing the grid points to zero; vi) determining a value for the grid points; vii) refining the value for at least a portion of the grid points; viii) selecting at least a portion of the grid points based one of the value and the refined value; and ix) imaging the editable surface using the selected grid points, the editable surface representing a best-fit approximation of the point set to the editable surface.

These and other objects, features and advantages of the present invention will become apparent to those skilled in the art from the following description of the various embodiments and related drawings.

BRIEF DESCRIPTION OF THE DRAWINGS

The present invention is described below with reference to the accompanying drawings in which like elements are referenced with like reference numerals, and in which:

FIG. 11 illustrates continuous (overlapping) blending functions for different B-Splines over a range of parameter values.

FIG. 12 illustrates properties of the blending functions in FIG. 11, which result in a convex hull.

FIG. 13 illustrates the geometric meaning of weights applied to control points.

DETAILED DESCRIPTION OF THE INVENTION

The subject matter of the present invention is described with specificity, however, the description itself is not intended to limit the scope of the invention. The claimed subject matter thus, might also be embodied in other ways, to include different steps or combinations of steps similar to the ones described herein, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

The present invention provides an improved system and method for analyzing 3D data sets and/or 3D point sets. The invention may be described in the general context of a computer-executable program of instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Figure 1:
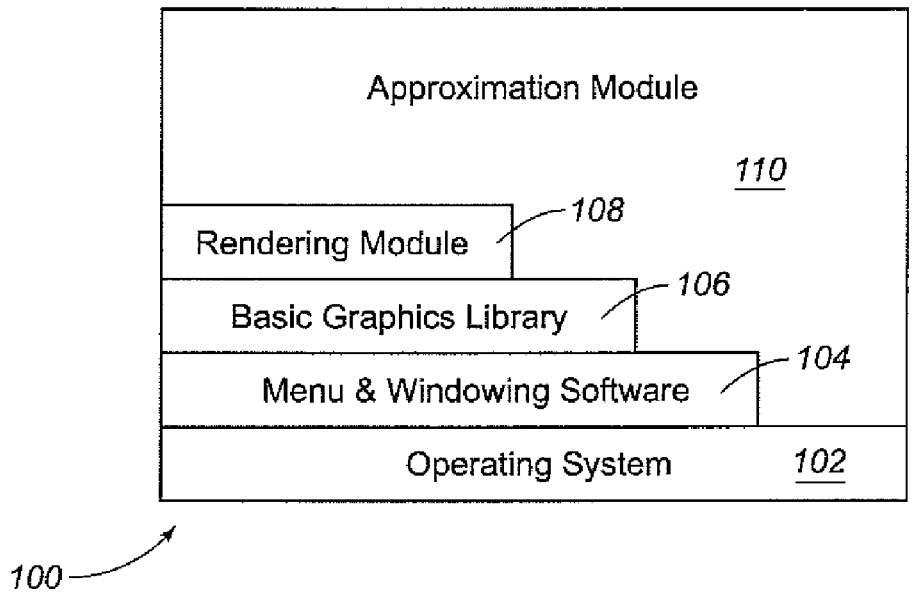
FIG. 1 is a block diagram illustrating one embodiment of a program for implementing the present invention.

The present invention may therefore, be implemented using hardware, software or a combination thereof, in a computer system or other processing system. FIG. 1 is a block diagram illustrating one embodiment of a software program 100 for implementing the present invention. At the base of program 100 is an operating system 102. A suitable operating system 102 may include, for example, a Windows® operating system from Microsoft Corporation, or other operating systems as would be apparent to one of skill in the relevant art.

Menu and windowing software 104 overlays operating system 102. The menu and windowing software 104 are used to provide various menus and windows to facilitate interaction with the user, and to obtain user input and instructions. As would be readily apparent to one of skill in the relevant art, any number of menu and windowing software programs could be used in conjunction with the present invention.

A basic graphics library 106 overlays the menu and windowing software 104. The basic graphics library 106 is an application programming interface (API) for computer graphics. The functions performed by the basic graphics library 106 may include, for example, geometric and raster primitives, RGBA or color index mode, display list or immediate mode, viewing and modeling transformations, lighting and shading, hidden surface removal, alpha blending (translucency), anti-aliasing, texture mapping, feedback and selection, stencil planes, and accumulation buffer.

A rendering application 108 overlays basic graphics library 106. As will be understood by those skilled in the art, the rendering application 108 may include a suite of tools for 2D/3D seismic data interpretations, including interactive horizon and fault management, 3D visualization, and attribute analysis. For example, Landmark Graphics Corporation's SeisVision™ platform is a seismic rendering application appropriate for use with the present invention.

Overlaying the other elements of program 100 is an approximation module 110. The approximation module 110 is configured to interact with 3D data sets representing predetermined objects such as, for example, horizons and faults or 3D point sets comprising arbitrary and/or unstructured data points. In a manner generally well known in the art, the approximation module 110 interfaces with, and utilizes the functions carried out by, the rendering application 108, the basic graphics library 106, the menu and windowing software 104, and the operating system 102. The approximation module 110 may be written in an object oriented programming language such as, for example, C++ to allow the creation and use of objects and object functionality.

The program 100 illustrated in FIG. 1 may be executed or implemented through the use of a computer system incorporating the program 100 and various hardware components. The hardware components may include, for example, a processor, memory (e.g., random access memory and/or non-volatile memory devices), one or more input devices, one or more display devices, and one or more interface devices. These hardware components may be interconnected according to a variety of configurations. Non-volatile memory devices may include, for example, devices such as tape drives, disk drives, semiconductor ROM or EEPROM. Input devices may include, for example, devices such as a keyboard, a mouse, a digitizing pad, a track ball, a touch-sensitive pad and/or a light pen. Display devices may include, for example, devices such as monitors, projectors and/or head-mounted displays. Interface devices may be configured to require digital image data from one or more acquisition devices and/or from one or more remote computers or storage devices through a network.

Any variety of acquisition devices may be used depending on the type of object being imaged. The acquisition device(s) may sense various forms of mechanical energy (e.g., acoustic energy, displacement and/or stress/strain) and/or electromagnetic energy (e.g., light energy, radio wave energy, current and/or voltage).

A processor may be configured to reprogram instructions and/or data from RAM and/or non-volatile memory devices, and to store computational results into RAM and/or non-volatile memory devices. The program instructions direct the processor to operate on 3D data sets and/or 3D point sets based on the methods described herein. The input data may be provided to the computer system through a variety of mechanisms. For example, the input data may be acquired into non-volatile memory and/or RAM using one or more interface devices. As another example, the input data may be supplied to the computer system through a memory medium such as a disk or a tape, which is loaded into/onto one of the non-volatile memory devices. In this case, the input data will have been previously recorded onto the memory medium.

It is noted that the input data may not necessarily be raw sensor data obtained by an acquisition device. For example, the input data may be the result of one or more processing operations using a set of raw sensor data. The processing operation(s) may be performed by the computer system and/or one or more other computers.

The method of the present invention may be realized in one or more software programs or modules, which are stored onto any of a variety of memory media such as CD-ROM, magnetic disk, bubble memory, semiconductor memory (e.g., any of a various types of RAM or ROM). Furthermore, the software program(s) and/or their results may be transmitted over a variety of carrier media such as optical fiber, metallic wire, free space and/or through any of a variety of networks such as the internet.

Figure 1A:
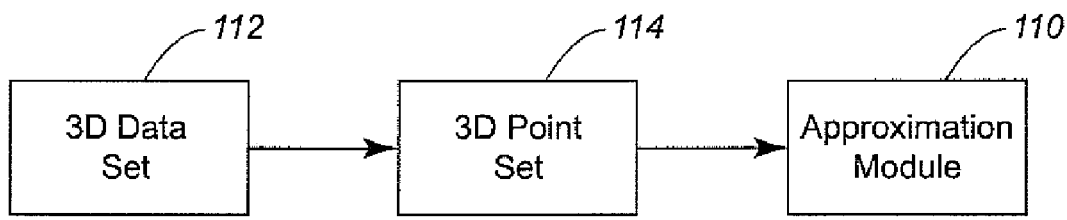
FIG. 1A is a schematic diagram generally illustrating the flow of data into the approximation module illustrated in FIG. 1.

In FIG. 1A, for example, a 3D data set 112 may comprise any predetermined object such as, for example, geoanomalies, geobodies, horizons, faults and/or other surfaces or any 3D point set comprising arbitrary and/or unstructured data points. The 3D data set 112 may be converted to a 3D point set 114, if necessary. The entire 3D point set 114, or a portion thereof, may be selected from the converted 3D data set 112 before being processed by the approximation module 110 to yield an image of an editable surface.

Figure 2:
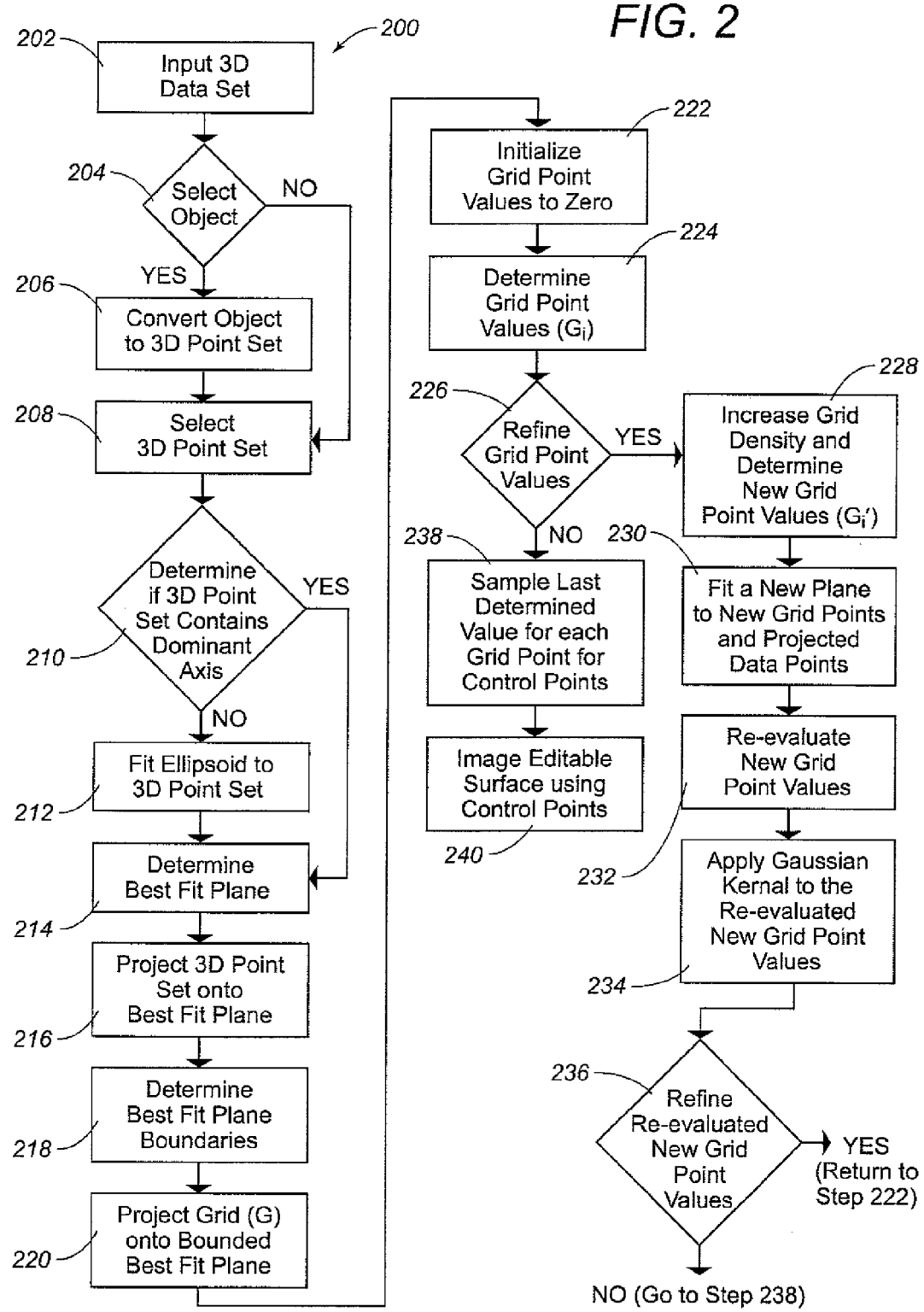
FIG. 2 is a flow diagram illustrating one embodiment of a method for implementing the present invention.

Referring now to FIG. 2, a method 200 for approximating an image of an editable surface from a 3D data set or a 3D point set is illustrated.

In step 202, a 3D data set may be used to input predetermined objects or 3D point sets comprising arbitrary and/or unstructured data points.

In step 204, an object may be selected from the 3D data set such as, for example, geoanomalies, geobodies, horizons, faults and/or other surfaces. Such objects may be predetermined using a number of imaging techniques well known in the art.

In step 206, the selected object is converted to a 3D point set using conversion techniques well known in the art. The converted 3D point set comprises arbitrary and/or unstructured data points corresponding with the initial data points comprising the initial input 3D data set. The 3D point set therefore, may comprise arbitrary and/or unstructured data points forming an arbitrary surface.

In step 208, a 3D point set may be selected from the initial input 3D data set (step 202) or the converted 3D point set (step 206), which may comprise all of the data points from the initial input 3D data set or a portion thereof. Thus, the selected 3D point set comprises arbitrary and/or unstructured data points corresponding with at least a portion of the initial data points comprising the initial 3D data set.

In step 210, the 3D point set selected in step 208 is analyzed to determine if it contains a dominant (long) axis. If a dominant axis can be determined for the 3D point set, then the next step 212 is unnecessary. For certain predetermined objects selected in step 204, a dominant axis may be readily apparent to one skilled in the art.

Figure 3:
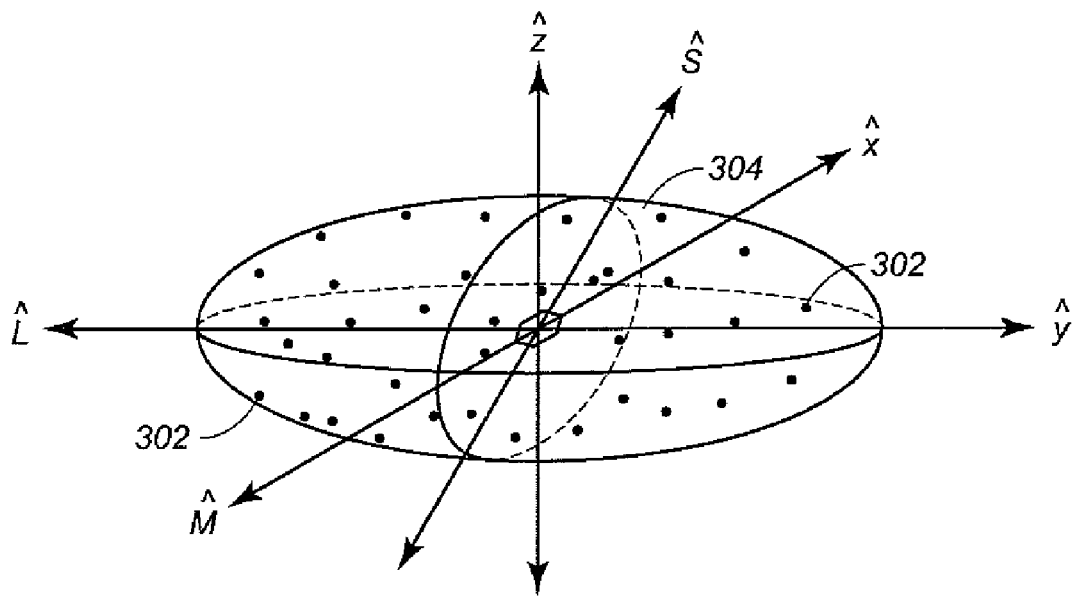
FIG. 3 illustrates step 212 in FIG. 2.

In step 212, an ellipsoid 304 is fit to the 3D point set (point cloud) illustrated in FIG. 3 by programming means well known in the art. The 3D point set is represented by data points 302. The ellipsoid 304 includes three cardinal axes, which may be denoted by the long axis ($\hat{L}$), the middle axis ($\hat{M}$) and the short axis ($\hat{S}$). In the case of a perfect circle, however, all three of the cardinal axes will have the same length. The short axis vector of the ellipsoid 304 is compared against the world coordinate axes (x, y, z) to determine the primary direction of a best-fit plane and therefore, which of the following three representations should be used for determining a best-fit plane in step 214:

$$z = f(x, y)$$

$$y = f(z, x)$$

$$x = f(y, z)$$

In step 214, the best-fit plane is determined by using a least squares approximation to achieve a best-fit plane equation. For example, let T be the matrix of n data points comprising the 3D point set such that:

$$T = \begin{pmatrix} \alpha_1 & \alpha_2 & \ldots & \alpha_n \\ \beta_1 & \beta_2 & \ldots & \beta_n \\ \gamma_1 & \gamma_2 & \ldots & \gamma_n \\ 1 & 1 & \ldots & 1 \end{pmatrix}$$

where:

$(\alpha_i, \beta_i, \gamma_i) = (x_i, y_i, z_i)$ if $z = f(x,y) - Z$ dominant $(\alpha_i, \beta_i, \gamma_i) = (z_i, x_i, y_i)$ if $y = f(z,x) - Y$ dominant $(\alpha_i, \beta_i, \gamma_i) = (y_i, z_i, x_i)$ if $x = f(y,z) - X$ dominant $i \in [1, n]$ Let M be the 4×4 matrix formed by T·T' where T' is the transpose of T. The least squares, best-fitting plane, equation is found by inverting the matrix M using LU decomposition, which yields the coefficients A, B, C, D in the following equation that may be used to determine the best-fit plane for the data points 302 comprising the 3D point set:

$$Ax + By + Cy + D = 0$$

Figure 4:
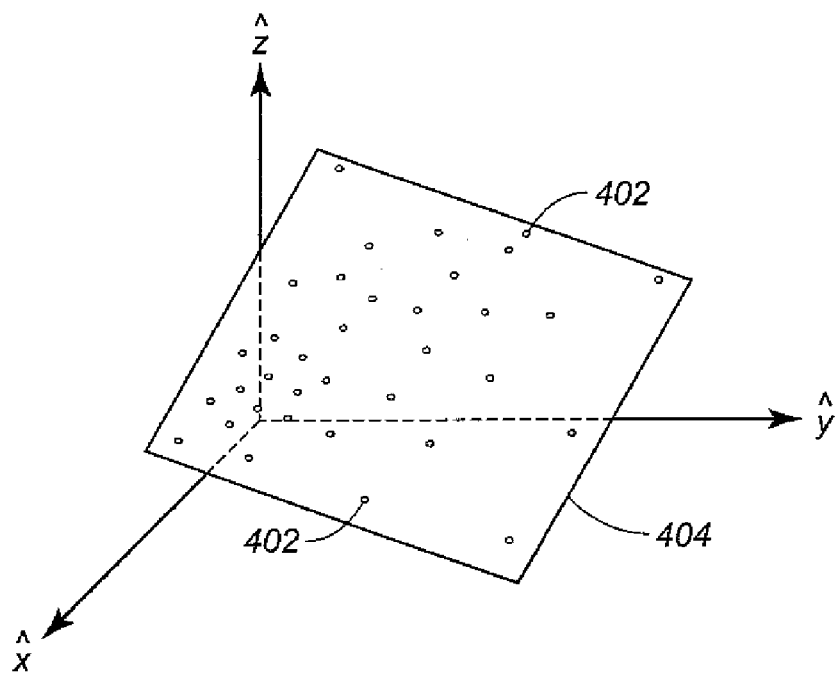
FIG. 4 illustrates step 216 and step 218 in FIG. 2.

In step 216, at least a portion of the data points 302 comprising the 3D point set are projected onto the best-fit plane 404 illustrated in FIG. 4 by programming means well known in the art. The more data points 302 that are projected onto the best-fit plane 404, the more accurate the results will be. Nevertheless, the number of data points 302 projected onto the best-fit plane 404 may be determined as a matter of preference. The data points 302 projected onto the best-fit plane 404 are illustrated as projected data points 402. The projected data points 402 may be represented in a parametric form $z' = f(x', y')$ where x', y', z' denote the orthogonal coordinate system of the best-fit plane 404 wherein x' and y' are aligned with the best-fit plane 404, and z' is perpendicular to the best-fit plane 404.

In step 218, boundaries for the best-fit plane are determined according to data point extremes, meaning the outermost projected data points 402. In FIG. 4, the best-fit plane 404 is illustrated with boundaries that are evident from the outermost projected data points 402.

Figure 5:
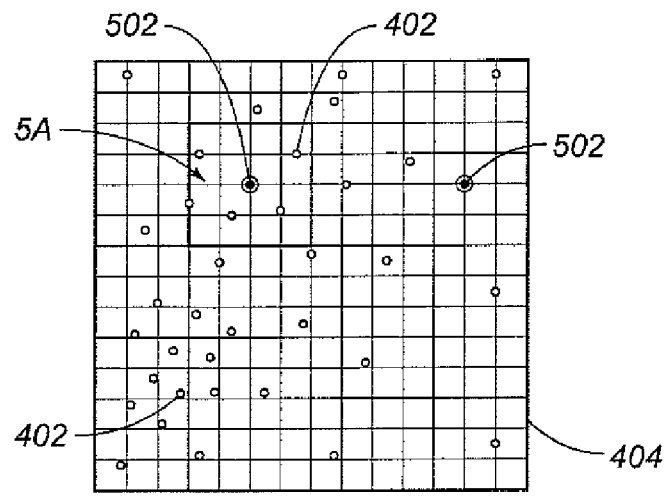
FIG. 5 illustrates step 220 and step 222 in FIG. 2.

In step 220, a grid is projected onto the bounded best-fit plane 404 illustrated in FIG. 5 by programming means well known in the art. The grid projected onto the best-fit plane 404 may be represented by N×M where N and M are predetermined grid parameters. The predetermined grid parameters (N×M) may be the same (N=M) or different (N≠M).

In step 222, each grid point 502, defined by an intersection on the grid illustrated in FIG. 5, is initialized, preferably to zero. In this manner, a grid point value may be determined for each grid point 502 illustrated in FIG. 5.

In step 224, the value for each grid point 502 illustrated in FIG. 5 may be determined by scanning for projected data points 402 within a predetermined area 5A. The more grid points 502 that are valued, the more accurate the results will be. Nevertheless, the number of grid points 502 to be valued may be determined as a matter of preference. The predetermined area 5A may comprise the entire set of projected data points 402 in the best-fit plane 404, or a subset thereof. The predetermined area 5A may be represented by a preferred cell (node) count corresponding with the spaces on the grid. For example, a preferred cell count of 16 may be represented as the 4×4 predetermined area 5A in FIG. 5. Alternatively, a preferred cell count of 16 may be represented as a 2×8 predetermined area.

Figure 5A:
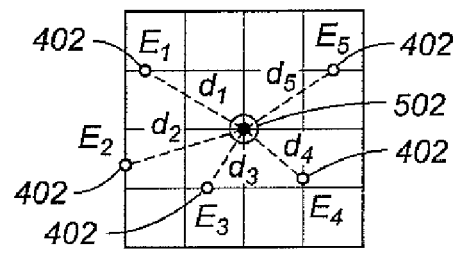
FIG. 5A illustrates step 224 in FIG. 2 and represents the area A in FIG. 5.

For each projected data point 402 within the predetermined area 5A, a data point value ($E_i$) is identified and recorded with a corresponding distance ($d_i$) to the grid point 502 illustrated in FIG. 5A. The grid point value ($G_i$) for the grid point 502 may be determined by the following normalized contribution formula:

$$G = \sum_{i=0}^{n-1} \left[ \frac{1}{\left\{ \sum_{i=0}^{n-1} \left( \frac{1}{d_1} \right) \right\} d_i} \right] E_i$$

where $G_i$ is the grid point value at each location of a grid point 502 based upon the data point values ($E_i$) for each projected data point 402 lying within the predetermined area 5A and its distance ($d_i$) to the grid point 502 being valued. This formula is valid for all distances ($d_i$) that do not equal zero. For those distances ($d_i$) that equal zero, the grid point value ($G_i$) is assigned the data point value ($E_i$) because it is known exactly. Thus, in FIG. 5A, the grid point value ($G_i$)

for the grid point 502 is determined using each of the data point values ($E_1, E_2, E_3, E_4, E_5$) and their respective distance ($d_1, d_2, d_3, d_4, d_5$) to the grid point 502 being valued. The same procedure may be applied for determining grid point values for the remaining grid points 502 by shifting the predetermined area 5A such that each grid point 502 being valued is in the same position within the predetermined area 5A. For grid points 502 that are near or on the borders of the best-fit plane 404, the grid point values are determined in the same manner except that the predetermined area 5A may partially reside outside of the best-fit plane 404 in order to maintain the same grid point position within the predetermined area 5A. Consequently, there are no projected data points 402 to scan outside of the best-fit plane 404 for consideration in determining the value of grid points 502 lying near or on the border of the best-fit plane 404.

In step 226, the grid point values may be refined in the manner described in reference to steps 228 through 236 once all of the grid point values ($G_i$) have been determined.

In step 228, the grid density is increased (e.g., doubled) and new grid point values ($G_i'$) for the new grid points are linearly interpolated between the former grid points 502 using the former grid point values ($G_i$) and interpolation techniques well known in the art.

Figure 6:
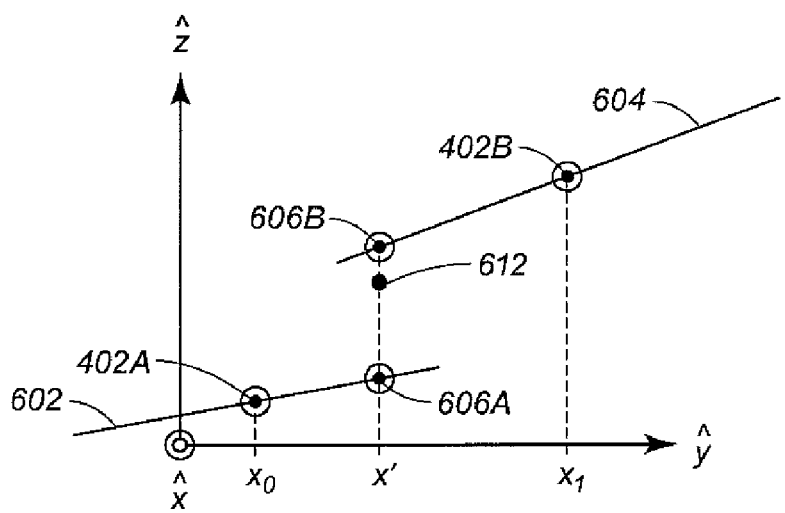
FIG. 6 illustrates step 228, step 230 and step 232 in FIG. 2.

In step 230, multiple new (best-fit) planes are determined using the equations described in reference to step 214 and a predetermined area, which may be the same predetermined area 5A illustrated in FIG. 5. In other words, at each projected data point 402, a new (best-fit) plane is determined (calculated) to fit the projected data points 402 and the new grid points within the surrounding predetermined area. In FIG. 6, for example, x' represents the incremental increase in grid density compared to previous grid spacing. A new (best-fit) plane 602 therefore, passes through the projected data point 402A and new grid point 606A within the surrounding predetermined area. A new (best-fit) plane 604 likewise, passes through projected data point 402B and new grid point 606B within the surrounding predetermined area. This step improves the accuracy of the interpolation performed in step 228, and determines a new (best-fit) plane for each projected data point 402.

In step 232, the interpolated new grid point values ($G_i'$) may be reevaluated by replacing each interpolated new grid point value within the predetermined area with a reevaluated new grid point value based on the weighted average of the value for all new grid points that intersect a new (best-fit) plane that passes through the predetermined area and a projected data point within the predetermined area. In FIG. 6, for example, the reevaluated value for new grid point 612 may be determined by replacing its previously interpolated new grid point value with the weighted average of the value for new grid points 606A, 606B that intersect the new (best-fit) planes 602, 604, respectively, that pass through the predetermined area and contain the projected data points 402A, 402B, respectively.

In step 234, a Gaussian kernel may be applied to each of the reevaluated new grid point values in order to smooth the resulting reevaluated new grid point values so that they have a more natural continuity. The Gaussian smoothing of the reevaluated new grid point values may be performed in a manner well known in the art. Various modifications to the Gaussian process of smoothing may be apparent to those skilled in the art and applied as necessary to improve the smoothing process described herein.

In step 236, at least a portion of the reevaluated new grid point values may be further refined by returning to step 222 and repeating some or all of the steps described thus far.

Upon reiterating step 224, however, the predetermined area 5A is incrementally reduced by a factor of one such that the surrounding predetermined area to be considered may be represented as (4−1)×(4−1). If, however, the reevaluated new grid point values are not refined, then the process proceeds to step 238. Likewise, if the grid point values are not refined according to step 226, the process may proceed directly to step 238.

Figure 7:
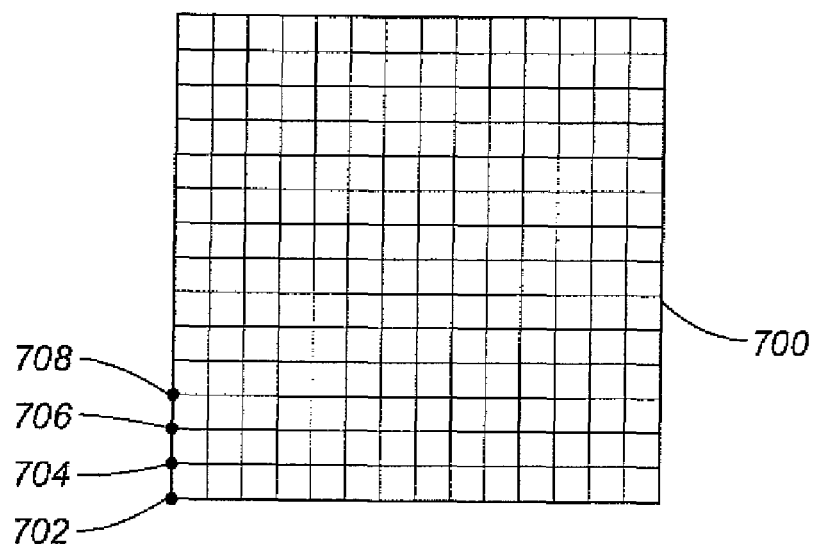
FIG. 7 illustrates step 236 and step 238 in FIG. 2.

In step 238, the grid point values and/or reevaluated new grid point values may be sampled for control points. The sampling process simply selects the last iteration of the process described in reference to step 236 such that the last value determined may be selected as a control point. In FIG. 7, for example, the best-fit plane 700 may include multiple values for grid point 702 that may be represented as $G_i$, $G_i'$, $G_1^2 \ldots G_i^n$. Similarly, grid points 704, 706, and 708, for example, may have multiple values. Accordingly, the last determined value for each grid point may be sampled (selected) in whole, or in part, to produce a set of control points for approximating an editable (NURBS) surface at any arbitrary resolution.

In step 240, the editable surface may be imaged (rendered) using at least a portion of the selected control points and the rendering techniques generally known for creating a NURBS surface. The more control points that are used to image the editable surface, the more accurate the results will be. In other words, a more accurate best-fit approximation of the editable surface is possible based on the number of selected control points that are used. Nevertheless, the number of control points that are used to image the editable surface may be determined as a matter of preference.

Figure 8:
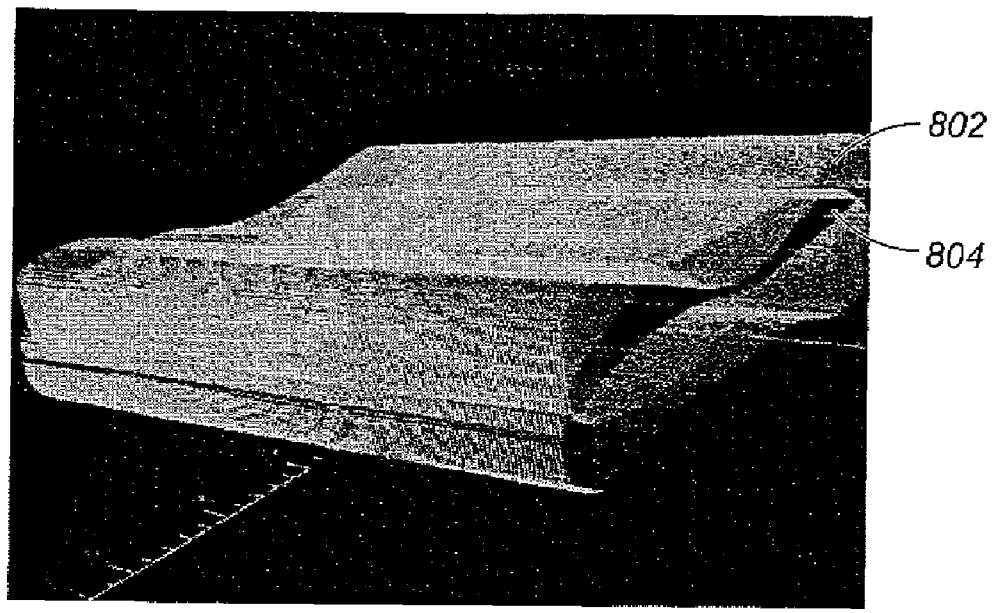
FIG. 8 is an image illustrating the input data points used to approximate the editable surface imaged at step 240 in FIG. 2.

In FIG. 8, for example, the input data points 802 and editable surface 804 are simultaneously imaged to illustrate the spatial relationship between the data points 802 that may be used as input at step 202 to approximate the editable surface 804. The data points 802 comprise seismic data that represent a predetermined object (editable surface curves), which may be manually generated in the manner described generally in International Publication No. WO 02/37422 and/or U.S. Pat. No. 6,765,570. The output resolution may be refined according to various well-known seismic rendering techniques as necessary or preferred.

Figure 9:
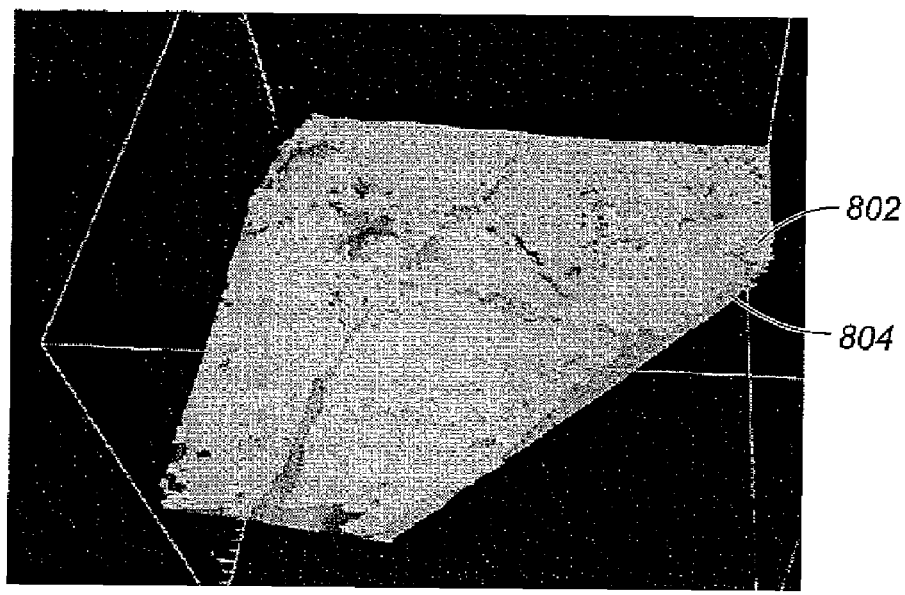
FIG. 9 is another perspective of a portion of the image in FIG. 8.

In FIG. 9, the image in FIG. 8 has been edited to illustrate a portion of the data points 802 and the corresponding editable surface 804, which may be used for interpreting seismic events.

Figure 10:
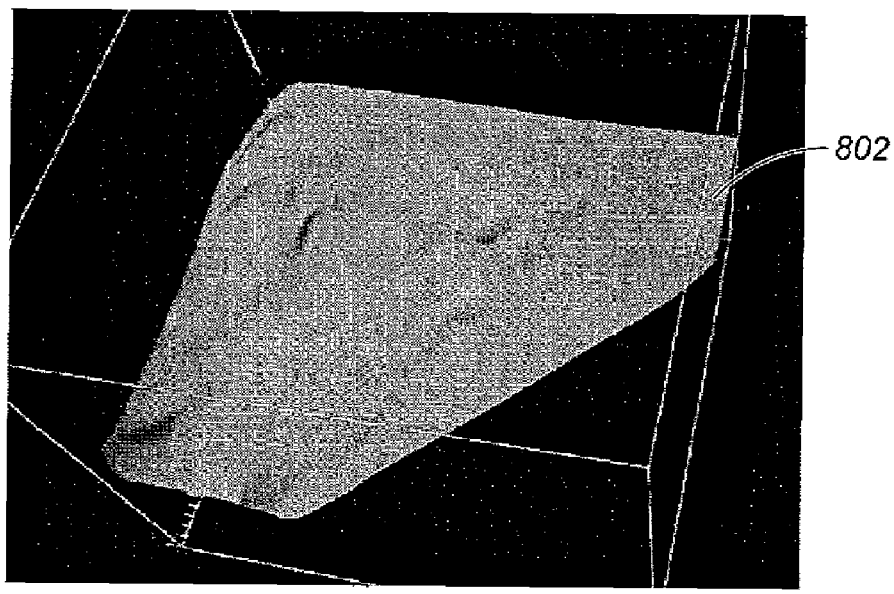
FIG. 10 is another perspective of a portion of the image in FIG. 9.

In FIG. 10, the data points 802 have been removed to reveal only the editable surface 804, which may also be used for interpreting seismic events.

The present invention therefore, may be applied to the geophysical analysis of seismic data. Moreover, the present invention may be integrated with one or more system components described in reference to International Publication No. WO 02/37422 and/or U.S. Pat. No. 6,765,570 for creating an editable surface from a plurality of seismic data points that may include, for example, x, y, z coordinates and a data value representing a predetermined object such as, for example, a horizon or a fault. The seismic image automatically rendered as a result of the present invention represents an editable NURBS surface, which may be interactively edited and manipulated and, which may lower the signal-to-noise ratio represented by the input data points compared to conventional techniques used to generate a NURBS surface.

The present invention, however, may also be applied to other types of 3D data sets such, for example, medical data and engineering data. It is therefore, contemplated that various situations, alterations and/or modifications may be made to the disclosed embodiments without departing from the spirit and scope of the invention by defined by the appended claims and equivalents thereof.

The invention claimed is:

1. A method for approximating an editable surface from a 3D data set comprising the steps of:
   selecting a 3D point set from the 3D data set;
   determining a best-fit plane for the 3D point set;
   projecting at least a portion of the 3D point set onto the best-fit plane;
   determining a boundary for the best-fit plane according to the projected 3D point set;
   projecting a grid onto the best-fit plane within the boundary, the grid containing a plurality of grid points;
   initializing the grid points;
   determining a value for at least a portion of the grid points;
   selecting at least a portion of the grid points with a value; and
   imaging the editable surface using at least a portion of the selected grid points.

2. The method of claim 1, wherein the 3D point set comprises an arbitrary surface.

3. The method of claim 2, further comprising the steps of:
   fitting an ellipsoid to the 3D point set; and
   determining a dominant axis for the 3D point set based on the ellipsoid.

4. The method of claim 3, wherein the dominant axis is used to determine the best-fit plane.

5. The method of claim 1, wherein the 3D point set comprises one of the 3D data set and a portion of the 3D data set.

6. The method of claim 1, wherein the best-fit plane is determined by a dominant axis for the 3D point set.

7. The method of claim 1, wherein the boundary of the best-fit plane is determined by a plurality of point extremes contained in the projected 3D point set.

8. The method of claim 1, wherein the projected grid is based on predetermined grid parameters.

9. The method of claim 1, wherein each grid point is defined by an intersection on the grid.

10. The method of claim 1, wherein the grid points are initialized to zero.

11. The method of claim 1, wherein the grid point value is determined by one or more points in the projected 3D point set within a predetermined area of the grid point and a distance from each point in the predetermined area to the grid point.

12. The method of claim 1, wherein the editable surface represents a best-fit approximation of the 3D point set to the editable surface.

13. The method of claim 1, wherein the editable surface represents a NURBS surface.

14. The method of claim 1, further comprising the steps of:
   refining the value for at least a portion of the at least a portion of the grid points; and
   selecting at least a portion of the grid points based on one of the value and the refined value.

15. The method of claim 14, further comprising the step of replacing the value with the refined value for the grid points selected with a value and a refined value.

16. The method of claim 1, further comprising the step of converting the 3D data set to the 3D point set.

17. A method for approximating an editable surface from a 3D point set comprising the steps of:
   determining a best-fit plane for the 3D point set;
   projecting the 3D point set onto the best-fit plane;
   determining a boundary for the best-fit plane according to the 3D point set;
   projecting a grid onto the best-fit plane within the boundary, the grid containing a plurality of grid points;
   initializing the grid points to zero;
   determining a value for the grid points;
   refining the value for at least a portion of the grid points;
   selecting at least a portion of the grid points based on one of the value and the refined value; and
   imaging the editable surface using the selected grid points, the editable surface representing a best-fit approximation of the 3D point set to the editable surface.

18. The method of claim 17, wherein the best-fit plane is determined by a dominant axis for the 3D point set.

19. The method of claim 17, wherein the boundary of the best-fit plane is determined by a plurality of point extremes contained in the projected 3D point set.

20. The method of claim 17, wherein the projected grid is based on predetermined grid parameters.

21. The method of claim 17, where in each grid point is defined by an intersection on the grid.

22. The method of claim 17, wherein the grid point value is determined by one or more points in the projected 3D point set within a predetermined area of the grid point and a distance from each point in the predetermined area to the grid point.

23. The method of claim 17, wherein the editable surface represents a NURBS surface.

24. The method of claim 17, further comprising the step of replacing the value with the refined value for the grid points selected with a value and a refined value.

25. The method of claim 22, wherein refining the value comprises:
   forming a new grid by increasing the grid density, the new grid containing a plurality of new grid points;
   determining a value for the new grid points;
   fitting a new plane to the new grid points;
   reevaluating the value for the new grid points; and
   smoothing the value for the new grid points.

26. The method of claim 25, further comprising the steps of:
   initializing the new grid points to zero; and
   determining a new value for the new grid points.

27. The method of claim 26, wherein the new grid point value is determined by one or more points in the 3D point set within another predetermined area of the new grid point and a distance from each point in the another predetermined area to the new grid point, wherein the another predetermined area is smaller than the predetermined area.

28. The method of claim 26, further comprising the step of repeating the steps in claim 25.

29. The method of claim 25, wherein the step of reevaluating the value for the new grid points comprises replacing each new grid point value within the predetermined area with a reevaluated new grid point value.

30. The method of claim 25, further comprising the step of refining the new grid point values.

31. The method of claim 30, further comprising the step of repeating one or more of the steps in claim 25.

32. A system for approximating an editable surface from a 3D data set comprising a computer-readable memory medium configured to store a program of instructions, the program instructions being executable to implement:

selecting a 3D point set from the 3D data set;
determining a best-fit plane for the 3D point set;
projecting at least a portion of the 3D point set onto the best-fit plane;
determining a boundary for the best-fit plane according to the projected 3D point set;
projecting a grid onto the best-fit plane within the boundary, the grid containing a plurality of grid points;
initializing the grid points;
determining a value for at least a portion of the grid points;
selecting at least a portion of the grid points with a value; and
imaging the editable surface using at least a portion of the selected grid points.

33. The system of claim 32, wherein the 3D point set comprises an arbitrary surface.

34. The system of claim 33, further comprising the steps of:
fitting an ellipsoid to the 3D point set; and
determining a dominant axis for the 3D point set based on the ellipsoid.

35. The system of claim 34, wherein the dominant axis is used to determine the best-fit plane.

36. The system of claim 32, wherein the 3D point set comprises one of the 3D data set and a portion of the 3D data set.

37. The system of claim 32, wherein the best-fit plane is determined by a dominant axis for the 3D point set.

38. The system of claim 32, wherein the boundary of the best-fit plane is determined by a plurality of point extremes contained in the projected 3D point set.

39. The system of claim 32, wherein the projected grid is based on predetermined grid parameters.

40. The system of claim 32, wherein each grid point is defined by an intersection on the grid.

41. The system of claim 32, wherein the grid points are initialized to zero.

42. The system of claim 32, wherein the grid point value is determined by one or more points in the projected 3D point set within a predetermined area of the grid point and a distance from each point in the predetermined area to the grid point.

43. The system of claim 32, wherein the editable surface represents a best-fit approximation of the 3D point set to the editable surface.

44. The system of claim 32, wherein the editable surface represents a NURBS surface.

45. The system of claim 32, further comprising the steps of:
refining the value for at least a portion of the at least a portion of the grid points; and
selecting at least a portion of the grid points based on one of the value and the refined value.

46. The system of claim 45, further comprising the step of replacing the value with the refined value for the grid points selected with a value and a refined value.

47. The system of claim 32, further comprising the step of converting the 3D data set to the 3D point set.

48. A system for approximating an editable surface from a 3D point set comprising a computer-readable memory medium configured to store a program of instructions, the program instructions being executable to implement:

determining a best-fit plane for the 3D point set;
projecting the 3D point set onto the best-fit plane;
determining a boundary for the best-fit plane according to the 3D point set;
projecting a grid onto the best-fit plane within the boundary, the grid containing a plurality of grid points;
initializing the grid points to zero;
determining a value for the grid points;
refining the value for at least a portion of the grid points;
selecting at least a portion of the grid points based on one of the value and the refined value; and
imaging the editable surface using the selected grid points, the editable surface representing a best-fit approximation of the 3D point set to the editable surface.

49. The system of claim 48, wherein the best-fit plane is determined by a dominant axis for the 3D point set.

50. The system of claim 48, wherein the boundary of the best-fit plane is determined by a plurality of point extremes contained in the projected 3D point set.

51. The system of claim 48, wherein the projected grid is based on predetermined grid parameters.

52. The system of claim 48, where in each grid point is defined by an intersection on the grid.

53. The system of claim 48, wherein the grid point value is determined by one or more points in the projected 3D point set within a predetermined area of the grid point and a distance from each point in the predetermined area to the grid point.

54. The system of claim 48, wherein the editable surface represents a NURBS surface.

55. The system of claim 48, further comprising the step of replacing the value with the refined value for the grid points selected with a value and a refined value.

56. The system of claim 53, wherein refining the value comprises:
forming a new grid by increasing the grid density, the new grid containing a plurality of new grid points;
determining a value for the new grid points;
fitting a new plane to the new grid points;
reevaluating the value for the new grid points; and
smoothing the value for the new grid points.

57. The system of claim 56, further comprising the steps of:
initializing the new grid points to zero; and
determining a new value for the new grid points.

58. The system of claim 57, wherein the new grid point value is determined by one or more points in the 3D point set within another predetermined area of the new grid point and a distance from each point in the another predetermined area to the new grid point, wherein the another predetermined area is smaller than the predetermined area.

59. The system of claim 57, further comprising the step of repeating the steps in claim 56.

60. The system of claim 56, wherein the step of reevaluating the value for the new grid points comprises replacing each new grid point value within the predetermined area with a reevaluated new grid point value.

61. The system of claim 56, further comprising the step of refining the new grid point values.

62. The system of claim 61, further comprising the step of repeating one or more of the steps in claim 56.

* * * * *

UNITED STATES PATENT AND TRADEMARK OFFICE
CERTIFICATE OF CORRECTION

PATENT NO. : 7,352,369 B2 Page 1 of 1
APPLICATION NO. : 11/118027
DATED : April 1, 2008
INVENTOR(S) : Sean Spicer and Zitao Xu It is certified that error appears in the above-identified patent and that said Letters Patent is hereby corrected as shown below:

In Column 13, Line 19
Replace the word "a" with the word --the--

In Column 13, Line 63
Replace the word "a" in both places with the word --the-- in both places In Column 14, Line 34
Replace the word "a" in both places with the word --the-- in both places In Column 15, Line 13
Replace the word "a" with the word --the--

In Column 15, Line 61
Replace the word "a" in both places with the word --the-- in both places Signed and Sealed this First Day of July, 2008

JON W. DUDAS
*Director of the United States Patent and Trademark Office*